United States Patent
Chen et al.

(10) Patent No.: US 9,927,649 B2
(45) Date of Patent: Mar. 27, 2018

(54) BACKLIGHT UNIT FOR DISPLAY DEVICES

(71) Applicant: Nanosys, Inc., Milpitas, CA (US)

(72) Inventors: Jian Chen, Saratoga, CA (US); Steven Gensler, San Jose, CA (US)

(73) Assignee: NANOSYS, INC., Milpitas, CA (US)

( * ) Notice: Subject to any disclaimer, the term of this patent is extended or adjusted under 35 U.S.C. 154(b) by 81 days.

(21) Appl. No.: 14/532,856

(22) Filed: Nov. 4, 2014

(65) Prior Publication Data

US 2015/0124195 A1    May 7, 2015

Related U.S. Application Data

(60) Provisional application No. 61/900,243, filed on Nov. 5, 2013.

(51) Int. Cl.
*G02F 1/1335* (2006.01)
*F21V 8/00* (2006.01)
(Continued)

(52) U.S. Cl.
CPC .......... *G02F 1/133512* (2013.01); *F21V 9/14* (2013.01); *G02B 6/005* (2013.01);
(Continued)

(58) Field of Classification Search
CPC ......... G02F 1/133512; G02F 1/133615; G02F 1/0105; G02F 1/133611;
(Continued)

(56) References Cited

U.S. PATENT DOCUMENTS 6,123,430 A * 9/2000 Ono .............. G02B 6/0055
362/23.15
6,949,206 B2 9/2005 Whiteford et al.
(Continued)

FOREIGN PATENT DOCUMENTS

JP        2004-71167 A    3/2004
WO   WO 2013/005644 A1   1/2013
(Continued)

OTHER PUBLICATIONS

Alivisatos, A. P., "Semiconductor clusters, nanocrystals, and quantum dots," Science 271:933-937 (1996).
(Continued)

*Primary Examiner* — Edward Glick
*Assistant Examiner* — Shan Liu
(74) *Attorney, Agent, or Firm* — Sterne, Kessler, Goldstein & Fox P.L.L.C.

(57) ABSTRACT

Embodiments of a display device and a method of reducing optical leakage from a backlight unit of a display device are described. The display device includes a backlight unit, an image generating unit coupled to the backlight unit and a blocking structure. The backlight unit is configured to transit light to the image generating unit and the blocking structure is configured to prevent the light from reaching the image generating unit without passing through the optical processing unit. The backlight unit includes a light source unit and an optical processing unit having a quantum dot film coupled to the light source unit. The method of reducing optical leakage from the backlight unit of the display device includes providing a first blocking structure to a portion of the light source unit and providing a second blocking structure to a portion of the optical processing unit.

24 Claims, 3 Drawing Sheets

(51) Int. Cl.
*G02F 1/01* (2006.01)
*F21V 9/14* (2006.01)
*G02F 1/1333* (2006.01)

(52) U.S. Cl.
CPC ...... *G02F 1/0105* (2013.01); *G02F 1/133615* (2013.01); *G02B 6/0023* (2013.01); *G02B 6/0065* (2013.01); *G02B 6/0073* (2013.01); *G02F 1/133603* (2013.01); *G02F 1/133611* (2013.01); *G02F 2001/133388* (2013.01); *G02F 2001/133614* (2013.01)

(58) Field of Classification Search
CPC ........ G02F 2001/133614; G02F 2001/133388; G02F 1/133603; G02B 6/005; G02B 6/0065; G02B 6/0073; G02B 6/0023; F21V 9/14
See application file for complete search history.

(56) References Cited

U.S. PATENT DOCUMENTS

| | | | |
|---|---|---|---|
| 7,267,875 B2 | 9/2007 | Whiteford et al. | |
| 7,374,807 B2 | 5/2008 | Parce et al. | |
| 7,572,393 B2 | 8/2009 | Whiteford et al. | |
| 7,645,397 B2 | 1/2010 | Parce et al. | |
| 8,283,412 B2 | 10/2012 | Liu et al. | |
| 8,563,133 B2 | 10/2013 | Whiteford et al. | |
| 2004/0218113 A1* | 11/2004 | You | G02B 6/0031 349/58 |
| 2008/0225203 A1* | 9/2008 | Kim | G02B 6/0031 349/65 |
| 2008/0237540 A1 | 10/2008 | Dubrow | |
| 2009/0180055 A1 | 7/2009 | Kim et al. | |
| 2009/0194774 A1 | 8/2009 | Huang et al. | |
| 2010/0039578 A1* | 2/2010 | Roh | G02F 1/133604 349/58 |
| 2010/0110728 A1 | 5/2010 | Dubrow et al. | |
| 2010/0328580 A1* | 12/2010 | Kim | G02B 6/0073 349/64 |
| 2011/0134355 A1* | 6/2011 | Yi | G02F 1/133512 349/58 |
| 2012/0050635 A1* | 3/2012 | Yoo | G02F 1/133605 349/58 |
| 2012/0113672 A1 | 5/2012 | Dubrow et al. | |
| 2012/0162569 A1* | 6/2012 | Sekiguchi | G02F 1/133308 349/58 |
| 2012/0249885 A1* | 10/2012 | Hosoki | G02B 6/005 348/725 |
| 2012/0257417 A1* | 10/2012 | Lee | G02B 6/005 362/622 |
| 2013/0044511 A1 | 2/2013 | Motooka et al. | |
| 2013/0148381 A1* | 6/2013 | Hatta | G02B 6/0033 362/624 |
| 2013/0182198 A1* | 7/2013 | Chang | G02F 1/133615 349/58 |
| 2013/0242226 A1* | 9/2013 | Jeong | G06F 1/1637 349/58 |
| 2014/0063416 A1* | 3/2014 | Shimizu | G02B 6/005 349/65 |
| 2014/0177268 A1* | 6/2014 | Zhou | G02B 6/005 362/606 |
| 2015/0009454 A1* | 1/2015 | Nagatani | G02B 6/005 349/65 |
| 2015/0055372 A1* | 2/2015 | Wu | G02B 6/002 362/613 |
| 2015/0116598 A1* | 4/2015 | Myojo | G02F 1/133308 348/725 |
| 2016/0139329 A1* | 5/2016 | Sasaki | G02F 1/133308 362/613 |

FOREIGN PATENT DOCUMENTS

| | | |
|---|---|---|
| WO | WO 2013/077568 A1 | 5/2013 |
| WO | WO 2013077568 A1 * | 5/2013 ........ G02F 1/133512 |

OTHER PUBLICATIONS

Murray, C.B. et al., "Synthesis and characterization of nearly monodisperse CdE (E=S, Se, Te) semiconductor nanocrystallites," J Am. Chem. Soc. 115:8706-8715 (1993).

Peng, X. et al., "Epitaxial growth of highly luminescent CdSe/CdS Core/Shell nanocrystals with photostability and electronic accessibility," J. Am. Chem. Soc. 30:7019-7029 (1997).

U.S. Appl. No. 10/796,832, Sher et al., "Process for Producing Nanocrystals and Nanocystrals Produced Thereby," filed Mar. 10, 2004 (Not Published).

International Search Report and Written Opinion of the International Searching Authority directed to related International Patent Application No. PCT/US2014/063871, dated Feb. 5, 2015; 17 pages.

English-language abstract of Japanese Patent Application Publication No. 2004-71167 A, published Mar. 4, 2004; 2 pages.

* cited by examiner

BACKLIGHT UNIT FOR DISPLAY DEVICES

BACKGROUND OF THE INVENTION

Field

The present invention relates to display devices comprising light-emitting diodes (LEDs) and films including luminescent nanocrystals such as quantum dots (QDs).

Background

In a backlight unit (BLU) of a display device (e.g., liquid crystal displays (LCDs)), LEDs are typically utilized as a light source. The LEDs may be arranged around the edge or perimeter of the display device and light emanating from the LEDs may enter a light guide plate (LGP), which distributes white light uniformly across the display device. White LED package designs have been optimized to enable high extraction efficiency and coupling efficiency into the LGP.

The BLUs often utilize phosphors, such as yttrium-aluminum-garnet (YAG) phosphors inside the LED package itself. Luminescent nanocrystals represent a new, alternative class of phosphors often used in configurations where the phosphor is placed external to the LED package. For example, luminescent nanocrystals may be embedded in a flexible film/sheet (e.g., quantum dot enhancement film (QDEF) supplied commercially from 3M Company, St. Paul, Minn. using quantum dots supplied by Nanosys, Inc, Milpitas, Calif.) that is placed above the LGP or the light source of the display device (see, e.g., U.S. Patent Publication Nos. 2010/0110728 and 2012/0113672, which are incorporated by reference herein in their entireties). In other examples, luminescent nanocrystals are encapsulated in a container, for example a capillary, which is placed between the LEDs and the LGP (see, e.g., U.S. Patent Publication No. 2010/0110728).

In current display devices, light may leak from the light sources of the BLU around the edges or perimeter of the display device and may appear as a hue of light around the sides of the display screen. This hue of light may be a problem when colored LEDs are used as light sources in the BLU. For example, FIG. 1 illustrates schematically a display device 100 having a blue hue of light 102 bordering around all sides (only sides 104 and 106 shown here) of a display screen 108 due to optical leakage from a blue LED light source in a BLU (not shown) of the display device 100. This blue hue of light bordering around the sides of the display screen 108 may interfere with the user's overall experience of the display device 100. For example, when there is a white background on the display device 100 and the display device 100 is used for reading electronic books, the blue hue of light at the edges fo the display screen can be an annoying distraction.

SUMMARY

Accordingly, there is need to increase the overall quality and user experience of display devices. Disclosed herein are embodiments that overcome the above mentioned limitations of display devices.

According to an embodiment, a device includes a backlight unit having a light source unit and an optical processing unit having a quantum dot film coupled to the light source unit. The device further includes an image generating unit coupled to the backlight unit, where the backlight unit is configured to transit light to the image generating unit. The device also includes a blocking structure configured to prevent the light from reaching the image generating unit without passing through the optical processing unit.

According to an embodiment, the light source unit includes a light emitting diode.

According to an embodiment, the light source unit includes a light guide plate optically coupled to a light emitting diode.

According to an embodiment, the quantum dot film includes a top surface adjacent the image generating unit and a bottom surface adjacent the light source unit.

According to an embodiment, the light source unit includes an array of light emitting diodes facing the bottom surface of the quantum dot film.

According to an embodiment, the image generating unit includes a liquid crystal module and a touch screen display coupled to the liquid crystal module.

According to an embodiment, the blocking structure includes tape.

According to an embodiment, the blocking structure includes paint.

According to an embodiment, the device further includes a frame configured to support the backlight unit.

According to an embodiment, the blocking structure includes a portion of the frame.

According to an embodiment, a portion of the blocking structure is interposed between the quantum dot film and the light source unit.

According to an embodiment, a portion of the blocking structure is interposed between the quantum dot film and the light guide plate.

According to an embodiment, the optical processing unit further includes a brightness enhancing film coupled to the quantum dot film and a polarizing film coupled to the brightness enhancing film.

According to an embodiment, a portion of the blocking structure is interposed between the quantum dot film and the brightness enhancing film.

According to an embodiment, a portion of the blocking structure is interposed between the brightness enhancing film and the polarizing film.

According to an embodiment, the quantum dot film includes a plurality of quantum dots configured to emit red light.

According to an embodiment, the quantum dot film includes a plurality of quantum dots configured to emit green light.

According to an embodiment, the quantum dot film includes a first plurality of quantum dots configured to emit red light and a second plurality of quantum dots configured to emit green light.

According to an embodiment, the device comprises at least one of a display device, a liquid crystal display device, a computer, a tablet, a hand-held device, a phone, a wearable device, and a TV.

According to another embodiment, a method of reducing optical leakage from a backlight unit of a display device includes providing a light source unit, providing an optical processing unit, providing an image generating unit, and providing a blocking structure. The blocking structure is configured to prevent light from reaching the image generating unit without passing through the optical processing unit.

According to an embodiment, the method includes providing the blocking structure as part of a frame of the display device.

According to an embodiment, the method includes providing the blocking structure along an edge of the light source unit.

According to an embodiment, the method includes providing the blocking structure along an edge of the optical processing unit.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

DETAILED DESCRIPTION OF THE INVENTION

Figure 1:
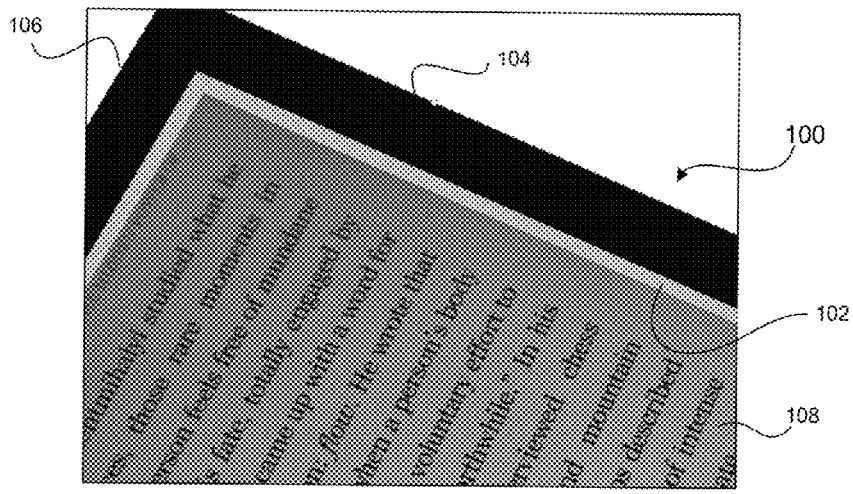
FIG. 1 illustrates schematically a display device with a blue hue of light around the perimeter of the display screen.

Although specific configurations and arrangements may be discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications beyond those specifically mentioned herein. It should be appreciated that the particular implementations shown and described herein are examples and are not intended to otherwise limit the scope of the application in any way.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

All numbers in this description indicating amounts, ratios of materials, physical properties of materials, and/or use are to be understood as modified by the word "about," except as otherwise explicitly indicated.

The term "about" as used herein includes the recited number ±10%. Thus, "about ten" means 9 to 11.

In embodiments, the term "forming a reaction mixture" or "forming a mixture" refers to combining at least two components in a container under conditions suitable for the components to react with one another and form a third component.

In embodiment, the terms "light guide plate," "light guide," and "light guide panel" are used interchangeably and refer to an optical component that is suitable for directing electromagnetic radiation (light) from one position to another.

In embodiments, the term "optically coupled" means that components are positioned such that light is able to pass from one component to another component without substantial interference.

The published patents, patent applications, websites, company names, and scientific literature referred to herein are hereby incorporated by reference in their entirety to the same extent as if each was specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

Technical and scientific terms used herein have the meaning commonly understood by one of skill in the art to which the present application pertains, unless otherwise defined. Reference is made herein to various methodologies and materials known to those of skill in the art.

Example Embodiments of Luminescent Nanocrystal Phosphors

Described herein are various compositions comprising nanocrystals, including luminescent nanocrystals. The various properties of the luminescent nanocrystals, including their absorption properties, emission properties and refractive index properties, may be tailored and adjusted for various applications. As used herein, the term "nanocrystal" refers to nanostructures that are substantially monocrystalline. A nanocrystal may have at least one region or characteristic dimension with a dimension of less than about 500 nm, and down to on the order of less than about 1 nm. The terms "nanocrystal," "nanodot," "dot," "quantum dot," and "QD" are readily understood by the ordinarily skilled artisan to represent like structures and are used herein interchangeably. The present invention also encompasses the use of polycrystalline or amorphous nanocrystals. As used herein, the term "nanocrystal" also encompasses "luminescent nanocrystals." As used herein, the term "luminescent nanocrystals" may mean nanocrystals that emit light when excited by an external energy source (suitably light source).

The material properties of nanocrystals may be substantially homogenous, or in certain embodiments, may be heterogeneous. The optical properties of nanocrystals may be determined by their particle size, chemical or surface composition. The ability to tailor the luminescent nanocrystal size in the range between about 1 nm and about 15 nm may enable photoemission coverage in the entire optical spectrum to offer great versatility in color rendering. Particle encapsulation may offer robustness against chemical and UV deteriorating agents.

Nanocrystals, including luminescent nanocrystals, for use in embodiments described herein may be produced using any method known to those skilled in the art. Suitable methods and exemplary nanocrystals are disclosed in U.S. Pat. No. 7,374,807; U.S. patent application Ser. No. 10/796,832, filed Mar. 10, 2004; U.S. Pat. No. 6,949,206; and U.S. Provisional Patent Application No. 60/578,236, filed Jun. 8, 2004, the disclosures of each of which are incorporated by reference herein in their entireties.

Luminescent nanocrystals for use in embodiments described herein may be produced from any suitable material, including an inorganic material, and more suitably an inorganic conductive or semiconductive material. Suitable semiconductor materials may include those disclosed in U.S. patent application Ser. No. 10/796,832, and may include any type of semiconductor, including group II-VI, group III-V, group IV-VI and group IV semiconductors. Suitable semiconductor materials may include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and an appropriate combination of two or more such semiconductors.

In certain embodiments, the nanocrystals may comprise a dopant from the group consisting of a p-type dopant or an n-type dopant. The nanocrystals useful herein may also comprise II-VI or III-V semiconductors. Examples of II-VI or III-V semiconductor nanocrystals may include any combination of an element from Group II, such as Zn, Cd and Hg, with any element from Group VI, such as S, Se, Te and Po, of the Periodic Table; and any combination of an element from Group III, such as B, Al, Ga, In, and Tl, with any element from Group V, such as N, P, As, Sb and Bi, of the Periodic Table.

The nanocrystals, including luminescent nanocrystals, described herein may also further comprise ligands conjugated, cooperated, associated or attached to their surface. Suitable ligands may include any group known to those skilled in the art, including those disclosed in U.S. Pat. No. 8,283,412; U.S. Patent Publication No. 2008/0237540; U.S. Patent Publication No. 2010/0110728; U.S. Pat. Nos. 8,563,133; 7,645,397; 7,374,807; 6,949,206; 7,572,393; and 7,267,875, the disclosures of each of which are incorporated herein by reference. Use of such ligands may enhance the ability of the nanocrystals to incorporate into various solvents and matrixes, including polymers. Increasing the miscibility (i.e., the ability to be mixed without separation) of the nanocrystals in various solvents and matrixes may allow them to be distributed throughout a polymeric composition such that the nanocrystals do not aggregate together and therefore do not scatter light. Such ligands are described as "miscibility-enhancing" ligands herein.

In certain embodiments, compositions comprising nanocrystals distributed or embedded in a matrix material are provided. Suitable matrix materials may be any material known to the ordinarily skilled artisan, including polymeric materials, organic and inorganic oxides. Compositions described herein may be layers, encapsulants, coatings, sheets or films. It should be understood that in embodiments described herein where reference is made to a layer, polymeric layer, matrix, sheet or film, these terms are used interchangeably, and the embodiment so described is not limited to any one type of composition, but encompasses any matrix material or layer described herein or known in the art.

Down-converting nanocrystals (for example, as disclosed in U.S. Pat. No. 7,374,807) utilize the emission properties of luminescent nanocrystals that are tailored to absorb light of a particular wavelength and then emit at a second wavelength, thereby providing enhanced performance and efficiency of active sources (e.g., LEDs).

While any method known to the ordinarily skilled artisan may be used to create nanocrystals (luminescent nanocrystals), a solution-phase colloidal method for controlled growth of inorganic nanomaterial phosphors may be used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," *J. Am. Chem. Soc.* 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," *J Am. Chem. Soc.* 115: 8706 (1993), the disclosures of which are incorporated by reference herein in their entireties. This manufacturing process technology leverages low cost processability without the need for clean rooms and expensive manufacturing equipment. In these methods, metal precursors that may undergo pyrolysis at high temperature are rapidly injected into a hot solution of organic surfactant molecules. These precursors may break apart at elevated temperatures and react to nucleate nanocrystals. After this initial nucleation phase, a growth phase may begin by the addition of monomers to the growing crystal. The result may be freestanding crystalline nanoparticles in solution that may have an organic surfactant molecule coating their surface.

Utilizing this approach, synthesis may occur as an initial nucleation event that takes place over seconds, followed by crystal growth at elevated temperature for several minutes. Parameters such as the temperature, types of surfactants present, precursor materials, and ratios of surfactants to monomers may be modified so as to change the nature and progress of the reaction. The temperature controls the structural phase of the nucleation event, rate of decomposition of precursors, and rate of growth. The organic surfactant molecules may mediate both solubility and control of the nanocrystal shape. The ratio of surfactants to monomer, surfactants to each other, monomers to each other, and the individual concentrations of monomers may strongly influence the kinetics of growth.

According to an embodiment, CdSe may be used as the nanocrystal material, in one example, for visible light down-conversion, due to the relative maturity of the synthesis of this material. Due to the use of a generic surface chemistry, it may also possible to substitute non-cadmium-containing nanocrystals.

In semiconductor nanocrystals, photo-induced emission arises from the band edge states of the nanocrystal. The band-edge emission from luminescent nanocrystals competes with radiative and non-radiative decay channels originating from surface electronic states. X. Peng, et al., *J Am. Chem. Soc.* 30:7019-7029 (1997). As a result, the presence of surface defects such as dangling bonds provide non-radiative recombination centers and contribute to lowered emission efficiency. An efficient and permanent method to passivate and remove the surface trap states may be to epitaxially grow an inorganic shell material on the surface of the nanocrystal. X. Peng, et al., *J. Am. Chem. Soc.* 30:7019-7029 (1997). The shell material may be chosen such that the electronic levels are type 1 with respect to the core material (e.g., with a larger bandgap to provide a potential step localizing the electron and hole to the core). As a result, the probability of non-radiative recombination may be reduced.

Core-shell structures may be obtained by adding organometallic precursors containing the shell materials to a reaction mixture containing the core nanocrystal. In this case, rather than a nucleation event followed by growth, the cores act as the nuclei, and the shells may grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and to ensure solubility. A uniform and epitaxially grown shell may be obtained when there is a low lattice mismatch between the two materials.

Exemplary materials for preparing core-shell luminescent nanocrystals may include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuP, CuCl, CuBr, CuI, $Si_3N_4$, $Ge_3N_4$, $Al_2O_3$, $(Al, Ga, In)_2 (S, Se, Te)_3$, AlCO, and shell luminescent nanocrystals for use in the practice of the present invention include, but are not limited to, (represented as Core/Shell), CdSe/ZnS, InP/ZnS, InP/ZnSe, PbSe/PbS, CdSe/CdS, CdTe/CdS, CdTe/ZnS, as well as others.

As used throughout, a plurality of phosphors or a plurality of luminescent nanocrystals means more than one phosphor or luminescent nanocrystal (i.e., 2, 3, 4, 5, 10, 100, 1,000, 1,000,000, etc., nanocrystals). The compositions will suitably comprise phosphors or luminescent nanocrystals having the same composition, though in further embodiments, the plurality of phosphors or luminescent nanocrystals may be various different compositions. For example, the luminescent nanocrystals may all emit at the same wavelength, or in further embodiments, the compositions may comprise luminescent nanocrystals that emit at different wavelengths.

Luminescent nanocrystals for use in the embodiments described herein may be less than about 100 nm in size, and down to less than about 2 nm in size and invention absorb visible light. As used herein, visible light is electromagnetic radiation with wavelengths between about 380 and about 780 nanometers that is visible to the human eye. Visible light can be separated into the various colors of the spectrum, such as red, orange, yellow, green, blue, indigo and violet. Blue light may comprise light between about 435 nm and about 500 nm, green light may comprise light between about 520 nm and 565 nm and red light may comprise light between about 625 nm and about 740 nm in wavelength.

According to various embodiments, the luminescent nanocrystals may have a size and a composition such that they absorb photons that are in the ultraviolet, near-infrared, and/or infrared spectra. The ultraviolet spectrum may comprise light between about 100 nm to about 400 nm, the near-infrared spectrum may comprise light between about 750 nm to about 100 μm in wavelength, and the infrared spectrum may comprise light between about 750 nm to about 300 μm in wavelength.

While luminescent nanocrystals of any suitable material may be used in the various embodiments described herein, in certain embodiments, the nanocrystals may be ZnS, InAs, CdSe, or any combination thereof to form a population of nanocrystals for use in the embodiments described herein.

As discussed above, in further embodiments, the luminescent nanocrystals may be core/shell nanocrystals, such as CdSe/ZnS, InP/ZnSe, CdSe/CdS or InP/ZnS.

According to various embodiments, the luminescent nanocrystals may include at least one population of luminescent nanocrystals capable of emitting red light and/or at least one population of luminescent nanocrystals capable of emitting green light upon excitation by a blue/UV light source. The luminescent nanocrystal wavelengths and concentrations may be adjusted to meet the optical performance required. In other embodiments, the luminescent nanocrystals phosphor material may comprise a population of luminescent nanocrystals which absorb wavelengths of light having undesirable emission wavelengths, and reemit secondary light having a desirable emission wavelength. In this manner, the luminescent nanocrystal films described herein may comprise at least one population of color-filtering luminescent nanocrystals to further tune the BLU emission and to reduce or eliminate the need for color filtering.

Suitable luminescent nanocrystals, methods of preparing luminescent nanocrystals, including the addition of various solubility-enhancing ligands, can be found in Published U.S. Patent Publication No. 2012/0113672, the disclosure of which is incorporated by reference herein in its entirety.

Example Embodiments of a Display Device

As used herein, a "display device" refers to an arrangement of elements that allow for the visible representation of data on a display screen. Suitable display screens may include various flat, curved or otherwise-shaped screens, films, sheets or other structures for displaying information visually to a user. Display devices described herein may be included in, for example, display systems encompassing a liquid crystal display (LCD), televisions, computers, mobile phones, smart phones, personal digital assistants (PDAs), gaming devices, electronic reading devices, digital cameras, tablets, wearable devices, car navigation systems, and the like.

Figure 2:
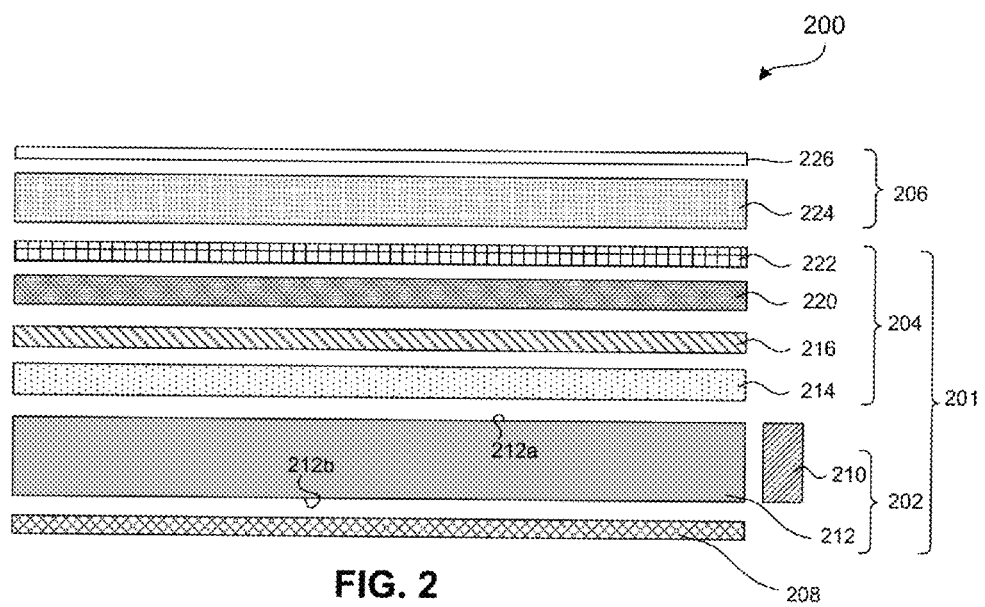
FIG. 2 illustrates a schematic of an exploded cross-sectional view of a display device, according to an embodiment.

FIG. 2 illustrates a schematic of an exploded cross-sectional view of a display device 200, which may be similar to display device 100 in structure and function, according to an embodiment. Display device 200 may comprise a backlight unit 201 including a light source unit (LSU) 202 and an optical processing unit (OPU) 204, according to an example of this embodiment. As shown in FIG. 2, display device 200 may further include an image generating unit (IGU) 206 and a reflector 208, according to an example of this embodiment.

LSU 202 may include an LED 210 (e.g., a blue LED) and a LGP 212 and may be configured to provide light to be processed in OPU 204 and subsequently, transmitted to IGU 206. Various orientations and components of LED 210 are well known to those of ordinary skill in the art. The blue LED may emit in the range from about 440 nm to about 470 nm. According to an embodiment, the blue LED may be, for example, a GaN LED that emits blue light at a wavelength of 450 nm.

LGP 212 may include fiber optic cables, polymeric or glass solid bodies such as plates, films, containers, or other structures. The size of LGP 212 may depend on the ultimate application and characteristics of LED 210. The thickness of LGP 212 may be compatible with thickness of LED 210. The other dimensions of LGP 212 may be designed to extend beyond the dimensions of LED 210, and may be on the order of 10's of millimeters, to 10's to 100's of centimeters.

According to various examples of this embodiment, the materials of LGP 212 may include polycarbonate (PC), poly methyl methacrylate (PMMA), methyl methacrylate, styrene, acrylic polymer resin, glass, or any suitable LGP materials known in the art. Suitable manufacturing methods for LGP 212 may include injection molding, extrusion, or other suitable embodiments known in the art. According to an example of this embodiment, LGP 212 may be configured to provide uniform primary light emission, such that primary light entering OPU 204 may be of uniform color and brightness. LGP 212 may include any thickness or shape known in the art. For example, thickness of LGP 212 may be uniform over the entire LGP 212 surface. Alternatively, LGP 212 may have a wedge-like shape.

LGP 212 may be optically coupled to LED 210 and may be physically connected or disconnected to LED 210, according to various examples of this embodiment. For physically connecting LGP 212 to LED 210, optically transparent adhesive may be used (not shown). The optically transparent adhesive may comprise tape, various glues, polymeric compositions such as silicones, etc., placed between LGP 212 and LED 210. Additional optically transparent adhesive may include various polymers, including, but not limited to, poly(vinyl butyral), poly(vinyl acetate), epoxies, and urethanes; silicone and derivatives of silicone, including, but not limited to, polyphenylmethylsiloxane, polyphenylalkylsiloxane, polydiphenylsiloxane, polydialkylsiloxane, fluorinated silicones and vinyl and hydride substituted silicones; acrylic polymers and copolymers formed from monomers including, but not limited to, methylmethacrylate, butylmethacrylate, and laurylmethacrylate; styrene based polymers; and polymers that are cross linked with difunctional monomers, such as divinylbenzene, according to various examples.

In further embodiments, LGP 212 may be physically connected to LED 210, for example, by utilizing a polymeric LGP 212, that when heated melts or deforms such that LED 210 may be contacted to LGP 212 it cools, thereby facilitating the formation of a physical adhesion or contact between the two elements. In further embodiments, optical coupling may be achieved with blue LEDs that have an encapsulant protruding from the LED, for example a protruding polymer surface filled with a compliant encapsulation polymer having a refractive index similar to the refractive index of the light guide plate. In such embodiments, when the light guide plate is pressed against the blue LED, an optical coupling is formed directly between the light guide plate and the LED via the protruding encapsulant, i.e., the encapsulation polymer.

Alternatively, light source unit 202 may include an array of LEDs (not shown), each of which may be similar to LED 210 in structure and function. The array of LEDs may be configured to provide the primary light to the OPU 204 for processing and for subsequent transmission to IGU 206.

According to an embodiment, OPU 204 may be configured to process the light received from LSU 202 to a desired characteristics for transmission to IGU 206. OPU 204 may include, but not limited to, a phosphor film 214, such as the QDEF film mentioned above, a brightness enhancing film (BEF) 216, a diffuser 220, and a reflective polarizing film (RPF) 222. It should be noted that OPU 204 may include more than one diffuser, BEF, and/or RPF without departing from the spirit and scope of the invention, as would be understood by a skilled person in the art. Orientations of these elements of OPU 204, their manufacture and incorporation in display devices are known in the art.

According to an embodiment, phosphor film 214 may be a QDEF including luminescent nanocrystals as described above. In an example embodiment, phosphor film 214 may include a plurality phosphors (e.g., luminescent nanocrystals) that emit at the same wavelength, for example, at the wavelength corresponding to green light or red light in the visible spectrum. In another example embodiment, phosphor film 214 may include a first plurality of phosphors (e.g., luminescent nanocrystals) that emit at a first wavelength and a second plurality of phosphors (e.g., luminescent nanocrystals) that emit at a second wavelength that is different from the first wavelength.

Diffuser 220 are distinct from and supplemental to the scattering features described herein. According to an example of this embodiment, diffuser 220 may include any diffuser film known in the art, including gain diffuser films, and may be disposed above or below BEF 216 or other optical films of display device 200.

In example embodiments, phosphor film 214 (e.g., QDEF comprising luminescent nanocrystals) may eliminate the need for a conventional bottom diffuser (not shown), thereby minimizing the thickness of BLU 201. The compositions of phosphor film 214 may also include one or more scattering or diffuser features associated therewith, which may serve the purpose of traditional diffusers in addition to increasing secondary emission of the phosphors in phosphor film 214.

According to an example of this embodiment, BEF 216 may include reflective and/or refractive films, reflective polarizer films, prism films, groove films, grooved prism films, prisms, pitches, grooves, or any suitable BEFs or brightness enhancement features known in the art. For example, BEF 216 may include conventional BEF such as Vikuiti™ or BEF available from 3M™. According to various embodiments, OPU 204 may include at least one BEF, at least two BEFs, or at least three BEFs. In example embodiments, at least one BEF comprises a reflective polarizer BEF, e.g., for recycling light which would otherwise be absorbed by RPF 222. The brightness-enhancing features and BEF 216 may include reflectors and/or refractors, polarizers, reflective polarizers, light extraction features, light recycling features, or any brightness-enhancing features known in the art. BEF 216 may include a first layer having pitches or prisms having a first pitch angle, according to an embodiment. Additionally or optionally, another BEF (not shown) in OPU 204 may include a second layer having pitches or prisms having a second pitch angle that is different from the first pitch angle.

According to another embodiment, IGU 206 may include an LCD module 224 and a display screen 226 and may be configured to generate images on display screen 226. Display screen 226 may be a touch screen display, according to an example embodiment.

In a further embodiment, reflector 208 may be configured to increase the amount of light that is emitted from LGP 212. Reflector 208 may comprise any suitable material, such as a reflective mirror, a film of reflector particles, a reflective metal film, or any suitable conventional reflectors. In an example embodiment, reflector 208 may include a white film. In certain embodiments, reflector 208 may comprise additional functionality or features, such as scattering, diffuser, or brightness-enhancing features.

As used herein, when describing elements of display devices, "oriented between" is meant to indicate that various elements are positioned relative to one another such that one element, e.g., a composition comprising phosphors, is above one element, but below another, in a configuration in which the elements are in a stack or layered orientation. It should be understood that other orientations may be utilized in the embodiments described herein, and can be readily determined by a person of ordinary skill in the art.

Additional elements that may be included in display devices described herein are described throughout.

Display device 200 may further comprise one or more medium materials (not shown) disposed between any of the adjacent elements in display device 200, for example between LED 210 and LGP 212; between LGP 212 and phosphor film 214; between any different layers or regions within phosphor film 214; between phosphor film 214 and one or more barrier layers (not shown) adjacent to phosphor film 214; between phosphor film 214 and BEF 216, diffuser 220, RPF 222, or other features; and between multiple barrier layers, or between any other elements of display device 200. The one or more medium materials may include any suitable materials, including, but not limited to, a vacuum, air, gas, optical materials, adhesives, optical adhesives, glass, polymers, solids, liquids, gels, cured materials, optical coupling materials, index-matching or index-mismatching materials, index-gradient materials, cladding or anti-cladding materials, spacers, epoxy, silica gel, silicones, any matrix materials described herein, brightness-enhancing materials, scattering or diffuser materials, reflective or anti-reflective materials, wavelength-selective materials, wavelength-selective anti-reflective materials, color filters, or other suitable medium material known in the art. Medium materials may also include optically transparent, non-yellowing, pressure-sensitive optical adhesives. Suitable materials include silicones, silicone gels, silica gel, epoxies (e.g., Loctite™ Epoxy E-30CL), acrylates (e.g., 3M™ Adhesive 2175), and matrix materials mentioned herein. The one or more medium materials may be applied as a curable gel or liquid and cured during or after deposition, or pre-formed and pre-cured prior to deposition. Curing methods may include UV curing, thermal curing, chemical curing, or other suitable curing methods known in the art. Index-matching medium materials may be chosen to minimize optical losses between elements of BLU 201.

Example Embodiments of Compositions of Phosphors

As used herein, the term "phosphors" refers to a synthetic fluorescent or phosphorescent substance. Exemplary phosphors include traditional materials such as cerium(II)-doped YAG phosphors (YAG:$Ce^{3+}$, or $Y_3Al_5O_{12}$:$Ce^{3+}$), as well as luminescent nanocrystals, as described herein. Additional phosphors that may be utilized in display devices, such as display device 200, described herein include, but are not limited to, silicate phosphors, garnet phosphors, aluminate phosphors, nitride phosphors, NYAG phosphors, SiAlON phosphors and $CaAlSiN_3$-based (CASN) phosphors, as well as other phosphors known in the art.

As described throughout, compositions comprising phosphors for use in, for example, phosphor film 214 (as described with reference to FIG. 2), may have numerous shapes, including for example, films or sheets. In further embodiments, the compositions may be various containers or receptacles for receiving the phosphors, suitably luminescent nanocrystals.

Suitably, phosphors, and specifically luminescent nanocrystals, may be dispersed or embedded in suitable polymeric materials and sandwiched between one or more barrier layers on either side of the matrix to create films or sheets, such as phosphor film 214, also called quantum dot enhancement films (QDEFs). Such films are described, for example, in U.S. Patent Publication Nos. 2010/0110728 and 2012/0113672, the disclosures of each of which are incorporated by reference herein in their entireties.

The luminescent nanocrystals of phosphor film 214 may be coated with one or more ligand coatings, embedded in one or more films or sheets, and/or sealed by one or more barrier layers. Such ligands, films, and barriers may provide photostability to the luminescent nanocrystals and protect the luminescent nanocrystals from environmental conditions including elevated temperatures, high intensity light, external gases, moisture, and other harmful environmental conditions. Additional effects may be achieved with these materials, including a desired index of refraction in the host film material, a desired viscosity or luminescent nanocrystal dispersion/miscibility in the host film material, and other desired effects. In embodiments, the ligand and film materials will be chosen to have a sufficiently low thermal expansion coefficient, such that thermal curing does not substantially affect the luminescent nanocrystal phosphor material.

The luminescent nanocrystals of phosphor film 214 may comprise ligands conjugated to, cooperated with, associated with, or attached to their surface. In an embodiment, the luminescent nanocrystals may include a coating layer comprising ligands to protect the luminescent nanocrystals from external moisture and oxidation, control aggregation, and allow for dispersion of the luminescent nanocrystals in the matrix material. Ligands and matrix materials, as well as methods for providing such materials, are described herein. Additional ligands and film materials, as well as methods for providing such materials, include any group known to those skilled in the art, including those disclosed in U.S. Patent Publication No. 2012/0113672; U.S. Pat. No. 8,283,412; U.S. Patent Publication No. 2008/0237540; U.S. Patent Publication No. 2010/0110728; U.S. Pat. Nos. 8,563,133; 7,645,397; 7,374,807; 6,949,206; 7,572,393; and 7,267,875, the disclosure of each of which is incorporated herein by reference in its entirety. Additionally, ligand and matrix materials may include any suitable materials in the art.

Dispersing luminescent nanocrystals in a polymeric material provides a method to seal the nanocrystals and provide a mechanism for mixing various compositions and sizes of luminescent nanocrystals. As used throughout, "dispersed" includes uniform (i.e., substantially homogeneous) as well as non-uniform (i.e., substantially heterogeneous) distribution or placement of luminescent nanocrystals.

Materials for use in the compositions (e.g., phosphor film 214) comprising the luminescent nanocrystals may include polymers and organic and inorganic oxides. Polymers may include any polymer known to the ordinarily skilled artisan that may be used for such a purpose. In an embodiment, the polymer may be substantially translucent or substantially transparent. Matrix materials may include, but are not limited to, epoxies; acrylates; norborene; polyethylene; poly(vinyl butyral):poly(vinyl acetate); polyurea; polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with difunctional monomers, such as divinylbenzene; cross-linkers suitable for cross-linking ligand materials; epoxides which combine with ligand amines (e.g., APS or PEI ligand amines) to form epoxy, and the like.

The luminescent nanocrystals as described herein may be embedded in a polymeric (or other suitable material, e.g., waxes, oils) matrix using any suitable method, for example, mixing the luminescent nanocrystals in a polymer and casting a film; mixing the luminescent nanocrystals with monomers and polymerizing them together; mixing the luminescent nanocrystals in a sol-gel, or any other method known to those skilled in the art. As used herein, the term "embedded" is used to indicate that the luminescent nanocrystals are enclosed or encased within the polymer. It should be noted that luminescent nanocrystals may be uniformly distributed throughout the composition, though in further embodiments they may be distributed according to an application-specific uniformity distribution function.

The thickness of the compositions (e.g., phosphor film 214) comprising luminescent nanocrystals as described herein may be controlled by any method known in the art, such as spin coating and screen printing. The luminescent nanocrystal compositions (e.g., phosphor film 214) as described herein may be any desirable size, shape, configuration and thickness. For example, the compositions (e.g., phosphor film 214) may be in the form of layers, as well as other shapes, for example, discs, spheres, cubes or blocks, tubular configurations and the like. The compositions (e.g., phosphor film 214) are on the order of about 100 mm in thickness (i.e., in one dimension), and down to on the order of less than about 1 mm in thickness. In other embodiments, the polymeric films may be on the order of 10's to 100's of microns in thickness. The luminescent nanocrystals may be embedded in the various compositions at any loading ratio that is appropriate for the desired function. For example, the luminescent nanocrystals may be loaded at a ratio of between about 0.001% and about 75% by volume depending upon the application, polymer and type of nanocrystals used. The appropriate loading ratios can readily be determined by the ordinarily skilled artisan and are described herein further with regard to specific applications. In an embodiment, the amount of nanocrystals loaded in a luminescent nanocrystal composition (e.g., in phosphor film 214) are on the order of about 10% by volume, to parts-per-million (ppm) levels.

Example Embodiments of a Display Device with Reduced Optical Leakage from a BLU

Figure 3A:
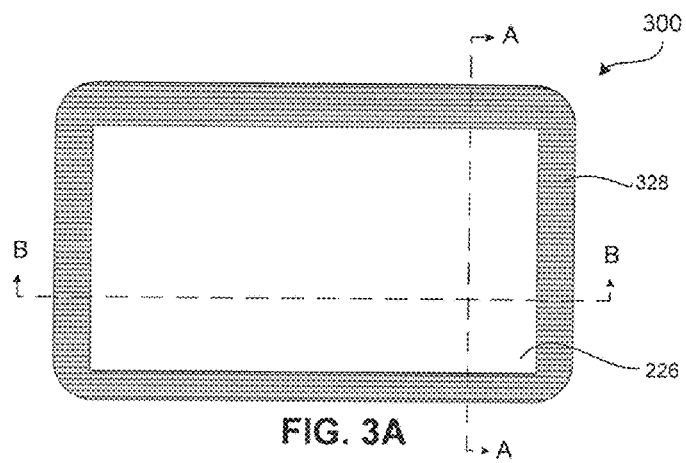
FIG. 3A illustrates a schematic top view of a display device, according to an embodiment.
Figure 3B:
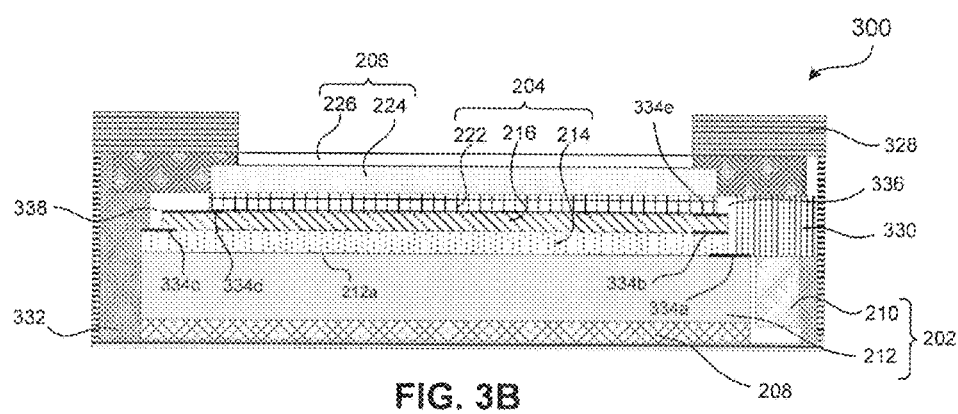
FIGS. 3B-3C illustrate schematic cross-sectional views along lines A-A and B-B, respectively, of the display device of FIG. 3A, according to various embodiments.
Figure 3C:
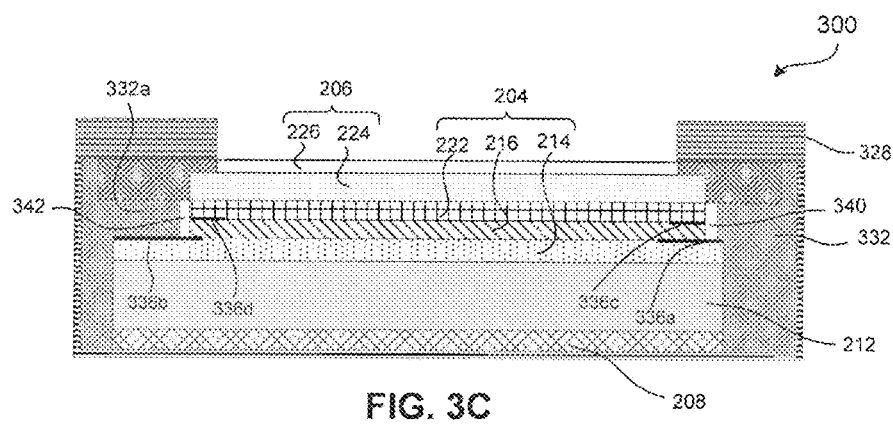

FIG. 3A illustrates a schematic top view of a display device 300 including a display screen 226 and a bezel 328, according to an embodiment. FIGS. 3B and 3C illustrates schematic cross-sectional views of display device 300 along line A-A and line B-B, respectively. Display device 300 may share many similar features with display device 200. Therefore, only differences between display devices 200 and 300 are to be discussed below.

Display device 300 includes LSU 202, OPU 204 and IGU 206, similar to display device 200, as described with reference to FIG. 2. As shown in FIG. 3B, display device 300 further includes LED driving and control unit 330 and a frame 332 configured to support BLU 201. Additionally or alternatively, frame 332 may be configured to hold down phosphor film 214 on LGP 212, according to an example of this embodiment.

Display device 300 yet further includes blocking structures 334a-334e and 336a-336b, as shown in FIGS. 3B and 3C, that may be configured to prevent any unprocessed light or partially processed light from reaching IGU 206, according to an embodiment. As used herein, the term "unprocessed light" refers to any light that has not been processed through OPU 204 to the desired characteristics and the term "partially processed light" refers to light that has not been processed through all layers of OPU 204. Presence of these blocking structures may eliminate or reduce optical leakage around perimeter of display screen 226 of display device 300 compared to current display devices as mentioned above with reference to display device 100 of FIG. 1.

In an example embodiment, blocking structure 334a may be configured to prevent LED 210 and/or LGP 212 light from passing through air gaps, such as air gap 336 into IGU 206 without being processed through OPU 204. Blocking structure 334a may be located on a top surface of LGP 212 to form a border along an edge or around a perimeter of LGP 212. A portion of blocking structure 334a may be interposed between phosphor film 214 and LGP 212, as shown in FIG. 3A. Alternatively, blocking structure 334a may be located only on the top surface of LGP 212 that may be non-overlapping with phosphor film 214 or any other elements of display device 300 and exposed to air gaps such as air gap 336.

In another embodiment, blocking structures 334b-33e may be configured to prevent partially processed light from passing through air gaps, such as air gaps 336 and 338 into IGU 206. Partially processed light from phosphor film 214 may be blocked by blocking structures 334b-334c from reaching IGU 206 through air gaps 336 and 338. Blocking structures 334b-334c may be located on a top surface of phosphor film 214 to form borders along respective edges of phosphor film 214 or to form a continuous border around a perimeter of phosphor film 214. Portions of blocking structures 334b-334c may be interposed between phosphor film 214 and BEF 216, as shown in FIG. 3A.

Similarly, partially processed light from BEF 216 may be blocked by blocking structures 334d-334e from reaching IGU 206 through air gaps 336 and 338. Blocking structures 334d-33e may be located on a top surface of BEF 216 to form borders along respective edges of BEF 216 or to form a continuous border around a perimeter of BEF 216. Portions of blocking structures 334d-334e may be interposed between BEF 216 and RPF 222, as shown in FIG. 3A.

FIG. 3C illustrates blocking structures 336a-336d that may be similar in structure and function to blocking structures 334b-334e, according to an embodiment. Blocking structures 336a-336b may be configured to block partially processed light that may be output from phosphor film 214 from passing through air gaps, such as air gaps 340 and 342 into IGU 206. And, blocking structures 336c-336d may be configured to block partially processed light from BEF 216 from passing through air gaps, such as air gas 340 and 342 into IGU 206.

According to various embodiments, blocking structures 334a-334e and 336a-336d may comprise tape, tab, insert, paint or the like that are optically non-transparent to any light in the visible spectrum. Additionally or alternatively, portions of frame 332 may be configured as a blocking structure, according to an example of this embodiment. For example, extended portion 332a of frame 332 may be configured to completely overlap the top surface of phosphor film 214 that is non-overlapping with BEF 216. In an embodiment, frame 332 may comprise material that is optically non-transparent to any light in the visible spectrum. It should be noted that such frame based blocking structures may be used alone or in conjunction with one or more of the other blocking structures, such as blocking structures 334a-334e and 336a-336d.

Figure 4A:
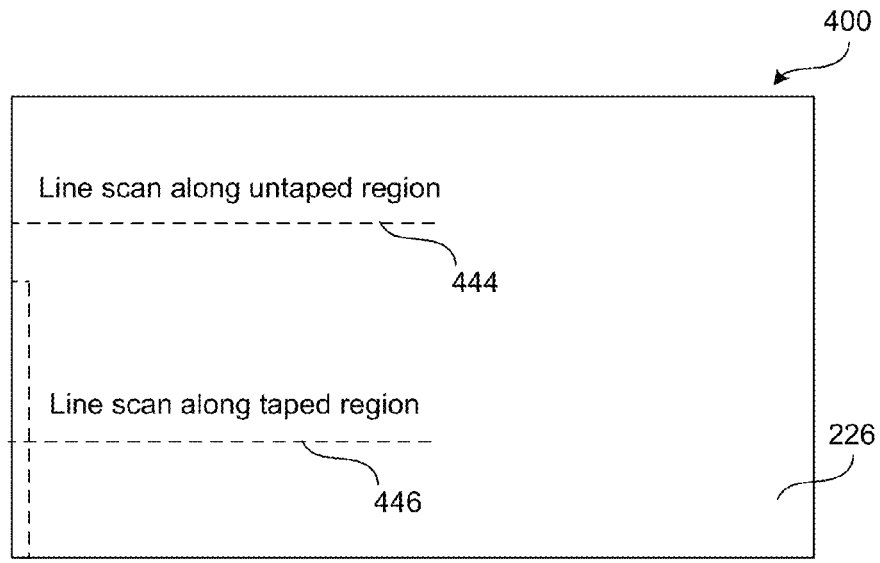
FIG. 4A illustrates top view of a display device having a blocking structure, according to an embodiment.
Figure 4B:
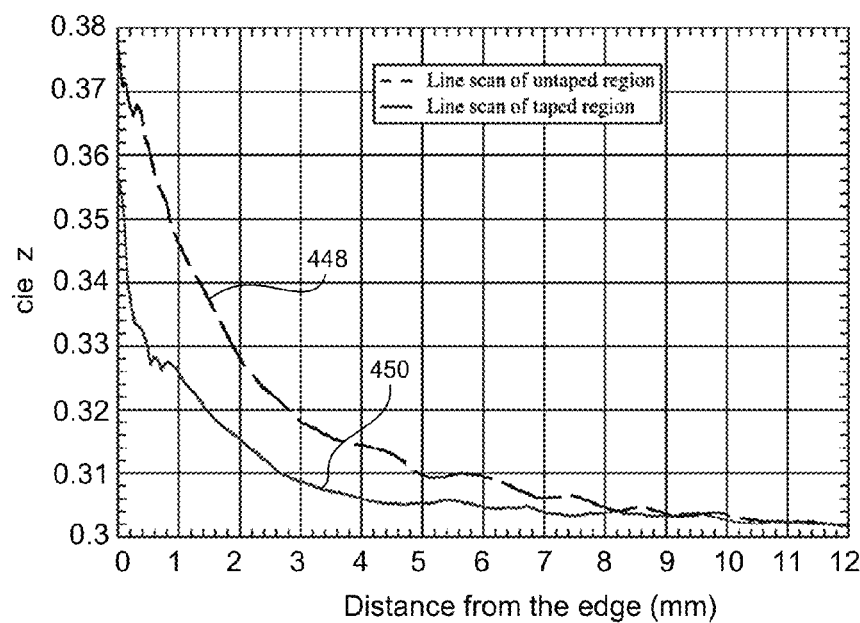
FIG. 4B illustrates optical measurements of the display device of FIG. 4A, according to an embodiment.

FIGS. 4A and 4B illustrates optical measurements taken on a display screen 226 of a display device 400, which is similar to display device 300, to demonstrate reduction of optical leakage with the use of blocking structures as described above with reference to FIGS. 3A and 3B. A first set of optical measurement may be taken on display screen 226 along a region 444 corresponding to a region on phosphor film 214 of display device 400 (not shown) without a blocking structure to prevent leakage of unprocessed blue light from a blue LED of LSU 202. A second set of optical measurements may be taken on display screen 226 along a region 446 corresponding to a region on phosphor film 214 having a blocking structure similar to blocking structure 336*a*. Plot 448 corresponds to the first set of optical measurements and plot 450 corresponds to the second set of optical measurements. As shown in FIG. 4B, plot 450 has a lower CIE Z (that measures blueness) value compared to a CIE Z value in 448 along edge of display screen 226. As known in the art, CIE stands for Commission Internationale de l'Eclairage (International Commission on Illumination).

It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments may be practiced otherwise than as specifically described.

What is claimed is:

1. A device comprising:
    a backlight unit comprising:
        a light source unit; and
        an optical processing unit comprising a quantum dot film coupled to the light source unit, wherein the optical processing unit is configured to process light from the light source unit;
    an image generating unit coupled to the backlight unit, wherein the backlight unit is configured to transmit the processed light to the image generating unit; and
    a blocking structure configured to prevent transmission of partially processed light from the optical processing unit to the image generating unit, wherein the partially processed light includes light that is not processed by all layers of the optical processing unit, and wherein a first surface of a first portion of the blocking structure contacts a surface of the light source unit and a second surface of the first portion of the blocking structure contacts a surface of the quantum dot film, and
    the optical processing unit further comprises a brightness enhancing film coupled to the quantum dot film, wherein a second portion of the blocking structure directly contacts both a top surface of the quantum dot film and a bottom surface of the brightness enhancing film.

2. The device of claim 1, wherein the light source unit comprises a light emitting diode.

3. The device of claim 1, wherein the light source unit comprises a light guide plate optically coupled to a light emitting diode.

4. The device of claim 1, wherein the quantum dot film comprises:
    a top surface adjacent the image generating unit; and
    a bottom surface adjacent the light source unit.

5. The device of claim 4, wherein the light source unit comprises an array of light emitting diodes facing the bottom surface of the quantum dot film.

6. The device of claim 1, wherein the image generating unit comprises:
    a liquid crystal module; and
    a touch screen display coupled to the liquid crystal module.

7. The device of claim 1, wherein the blocking structure comprises tape.

8. The device of claim 1, wherein the blocking structure comprises paint.

9. The device of claim 1, further comprising a frame configured to support the backlight unit.

10. The device of claim 9, wherein the blocking structure comprises a portion of the frame.

11. The device of claim 1, wherein the optical processing unit comprises a diffuser film and a third portion of the blocking structure is interposed between the quantum dot film and the diffuser film.

12. The device of claim 1, wherein a third portion of the blocking structure is interposed between the quantum dot film and a light guide plate.

13. The device of claim 1, wherein the optical processing unit further comprises:
    a polarizing film coupled to the brightness enhancing film.

14. The device of claim 13, wherein a third portion of the blocking structure is interposed between the brightness enhancing film and the polarizing film.

15. The device of claim 1, wherein the quantum dot film comprises a plurality of quantum dots configured to emit red light.

16. The device of claim 1, wherein the quantum dot film comprises a plurality of quantum dots configured to emit green light.

17. The device of claim 1, wherein the quantum dot film comprises:
    a first plurality of quantum dots configured to emit red light; and
    a second plurality of quantum dots configured to emit green light.

18. The device of claim 1, wherein the device comprises at least one of a display device, a liquid crystal display device, a computer, a tablet, a hand-held device, a phone, a wearable device, and a TV.

19. The device of claim 1, wherein the blocking structure is further configured to prevent transmission of light from the backlight unit to the image generating unit without passing through the optical processing unit.

20. A method of reducing optical leakage from a backlight unit of a display device, the method comprising:
    providing a light source unit;
    providing an optical processing unit configured to process light from the light source unit;
    providing an image generating unit;
    providing a blocking structure configured to prevent transmission of partially processed light from the optical processing unit to the image generating unit, wherein the partially processed light includes light that is not processed by all layers of the optical processing unit, and wherein a first surface of a first portion of the blocking structure contacts a surface of the light source unit and a second surface of the first portion of the blocking structure contacts a surface of the optical processing unit, and
    the optical processing unit further comprises a brightness enhancing film coupled to a quantum dot film, wherein a second portion of the blocking structure directly contacts both a top surface of the quantum dot film and a bottom surface of the brightness enhancing film.

21. The method of claim 20, comprising providing the blocking structure as part of a frame of the display device.

22. The method of claim 20, comprising providing the blocking structure along an edge of the light source unit.

23. The method of claim 20, comprising providing the blocking structure along an edge of the optical processing unit.

24. The method of claim 20, wherein the blocking structure is further configured to prevent transmission of light from the backlight unit to the image generating unit without passing through the optical processing unit.

* * * * *